United States Patent Office 3,520,866
Patented July 21, 1970

3,520,866
PREPARATION OF COORDINATION CATALYST TYPE POLYPROPYLENE WITHOUT SUBSEQUENT REMOVAL OF CATALYST RESIDUE
Robert Bacskai, Berkeley, Calif., assignor to Chevron Research Company, San Francisco, Calif., a corporation of Delaware
No Drawing. Filed Sept. 26, 1966, Ser. No. 581,712
Int. Cl. C08f 1/90, 3/10
U.S. Cl. 260—93.7                                6 Claims

ABSTRACT OF THE DISCLOSURE

The process of polymerizing polypropylene with a coordination catalyst in the presence of a hydrocarbon solvent is improved by the steps of terminating the polymerization by neutralizing the coordination catalyst with alkanol solution of alkali metal alkoxide and removing hydrocarbon solvent and alkanol to leave polypropylene containing neutralized coordination catalyst.

---

This invention relates to a unique improvement in the process for making polypropylene using Ziegler-type catalysts.

Much of the art on polymerizing mono-α-olefins of 3 to 6 carbon atoms such as propylene with Ziegler-type coordination catalysts in the presence of hydrocarbon solvents concerns means for terminating the polymerization and removing the catalyst residue from the polymer. The conventional approach is to deactivate the catalyst with alcohol and wash the polymer with water or alcohol-acid solutions to remove the catalyst residue. The goal of these processes has been to obtain as pure a polymer as possible; thus presumably decreasing the likelihood of future polymer degradation. Conventional processes presently use centrifuges and filters to remove these catalyst residues. They require dryers and distillation equipment to clean up the hydrocarbon solvent for recycle.

An improved process has now been found whereby the catalyst is neutralized and is not subsequently removed from the polypropylene. Surprisingly, the properties of the polypropylene made by this unique process are not significantly affected by the presence of these neutralized catalyst residues. This improvement in polymerizating polypropylene with Ziegler-type catalysts in the presence of hydrocarbon solvents comprises the steps of neutralizing the organoaluminum compound and titanium trihalide of the catalyst with an alkanol solution of an alkali metal alkoxide and removing the hydrocarbon solvent to leave polypropylene containing the neutralized catalyst. The phrase "neutralizing the organoaluminum compound and titanium halide" is intended to include the neutralization of complexes formed by these compounds in the polymerization.

The Ziegler-type catalyst and process conditions for polymerizing propylene to heptane-insoluble polypropylene are well known in the art. These catalysts normally comprise an organoaluminum compound and titanium trihalide. The titanium trihalide may be titanium tribromide or titanium trichloride. It may be activated or unactivated. A preferred catalyst is violet titanium trichloride.

The organoaluminum compounds are hydrocarbyl aluminum compounds in which the ratio of hydrocarbyl groups to aluminum is greater than one and the remaining valences of the aluminum, if any, are satisfied by halogens. Examples of such organoaluminum compounds are trihydrocarbylaluminum, dihydrocarbylaluminum halide and hydrocarbylaluminum sesquihalides. The halogens of these compounds may be fluorine, chlorine, bromine or iodine but are preferably chlorine. The hydrocarbyl groups usually each contain 1 to 10 carbon atoms, preferably 1 to 6 carbon atoms. The hydrocarbyl groups may be aliphatic, alicyclic, or aromatic. Preferably, they are alkyl. Dialkylaluminum chloride compounds are preferred. The mol ratio of organoaluminum compound to titanium halide is usually in the range of 1:1 to 5:1, preferably 2:1 to 4:1.

The polymerization may be carried out at about 35° C. to 100° C. Pressures may vary from 10 to 2,000 p.s.i. but they will usually be in the range of about 10 to 200 p.s.i. The propylene concentration will be in the range of about 5% by weight of the solution up to 100% of the solution (serving as its own solvent). Preferably, it will be 100% of the solution. Hydrocarbon solvents which may be used if propylene is not used as its own solvent are aliphatic and aromatic hydrocarbons having 2 to 10 carbon atoms. Aliphatic hydrocarbons such as pentane, hexane, heptane and octane are preferred. The proportion of titanium in the catalyst to the solvent will usually be in the range of about 0.1 to 5 mM. per 100 ml., preferably 0.5 to 2.0 mM. per 100 ml. of solvent.

The polypropylene made by the process of this invention is stereoregular. It is substantially insoluble in boiling heptane and will usually be substantially crystalline, i.e., at least about 85% insoluble in boiling heptane and more usually at least about 90% insoluble in boiling heptane.

By the improvement of this invention the polymerization is terminated by neutralizing the coordination catalyst with an alkali metal alkoxide containing 1 to about 6 carbon atoms. Alkoxides of this type may be made by reacting an alkali metal with an appropriate monohydric alcohol. The alkoxide will be used in at least about stoichiometric proportions to the organoaluminum compound and titanium halide combined. Desirably, it is added to the polymerization mixture with vigorous agitation. Examples of suitable alkoxides are sodium methoxide, sodium ethoxide, sodium propoxide, potassium butoxide and the like. Methoxides are preferred. The alkanol solution of the alkoxide should be homogeneous. Its concentration should be such that the alkoxide will not precipitate. Preferably, it is as concentrated as possible within these limits. In the improved process of this invention, clean up of the hydrocarbon solvent may be minimized by using concentrated alkoxide solutions. That is, the hydrocrabon solvent will be contaminated with only a very small amount of alkanol when a concentrated solution is used. Accordingly, the involved distillation and drying required by the art processes may be avoided by using the improvement of this invention. Although more dilute solutions may be used, the alkanol solution will usually be in the range of about 0.1 to 3 molar.

In a batch process, the alkanol solution may be added directly to the reaction vessel. However in a continuous process it is desirable to add the alkoxide solution in a separate blender. After blending, the solvent and the small amount of alcohol is removed from the polymer by evaporation. The solvent may be recovered, dried and recycled, if desired.

The polypropylene thus formed contains small amounts, usually less than about one weight percent, of neutralized catalyst. In this form it is ready for further handling if desired. For instance, it may be pelletized. It may also be blended with other polymers, pigments, dying agents, ultraviolet stabilizers, oxidation stabilizers and the like. It may be extruded or molded into useful objects.

The following examples illustrate the improved process of this invention. They are intended only to illustrate and are not meant to limit the invention. Unless otherwise indicated, percentages are by weight.

EXAMPLE 1

500 ml. of pentane, 4 mM. diethylaluminum chloride and 2 mM. TiCl$_3$ AA (3:1 mol ratio of TiCl$_3$ and AlCl$_3$) were charged to an autoclave. The autoclave was pressured to 8 p.s.i. with hydrogen and mixed at room temperature. It was then heated to about 70° C. and pressurized to 80 p.s.i. with propylene. After 11 hrs. the autoclave was cooled and vented to the atmosphere. 6 ml. of a 2 M sodium methoxide-methanol solution were added to the autoclave with vigorous agitation. The pentane, excess propylene and methanol were then evaporated by pasing air through the autoclave. 141.7 g. polypropylene were obtained. It had an intrinsic viscosity of 3.01 dl./g. (in Decalin at 135° C.) and was 92.2% insoluble in boiling heptane. Its metal analysis was: Al 0.065%, Ti 0.52% and Na 0.17%. A standard stabilizer mixture comprising 0.75% of the polypropylene was blended with the polypropylene. The physical properties of this polypropylene as compared to a commercial polypropylene (intrinsic viscosity=2.92 dl./g., 93.6% heptane-insoluble) were as follows:

| Property | Polymer containing neutralized catalyst | Commercial |
| --- | --- | --- |
| Brittle Pt. (° C.) at 50% failure [1] | 24.2 | 17.3 |
| Tensile impact (ft. lbs./in.$^2$) [2] | 15.7 | 13.5 |
| Heat Distortion at 264 p.s.i. (° C.) [3] | 57 | 59 |
| Initial tensile modulus (p.s.i.) [4] | 244,780 | 265,580 |
| Yield strength (p.s.i.) [4] | 5,103 | 4,990 |
| Percent Elongation at break [4] | 10.0 | 8.5 |
| Strength to break (p.s.i.) [4] | 6,623 | 5,935 |

[1] ASTM D746-64T.
[2] ASTM D1822-61T.
[3] ASTM D648-56.
[4] ASTM D638-64T.

EXAMPLE 2

200 ml. of pentane, 2.0 mM. diethylaluminum chloride and 0.20 g. TiCl$_3$ AA were charged to a vessel. The vessel's contents were mixed at room temperature, heated to 60° C. and then pressurized to 50 p.s.i. with propylene. After 18 hours the vessel was cooled and vented to the atmosphere. 4 ml. of a 2 M sodium propoxide-propanol solution were added to the vessel with mixing. The pentane, excess propylene and propanol were evaporated off by passing air through the vessel. The contents were dried in a vacuum at 80° C. to give 75.5 g. of substantially heptane insoluble polypropylene. The polypropylene was blended with a standard stabilizer mixture comprising 0.75% of the polyproylene. 10 g. of this blend were compression molded into an 0.020 in. thick sheet. The sheet was placed in an oven at 155° C. Its oven life (time until significant crazing) was 2.5 days. A commercial polypropylene of comparable heptane insolubility was also tested for oven life. Its oven life at 155° C. was less than 0.5 day.

As will be evident to those skilled in the art, various modifications on this invention can be made or followed, in the light of the foregoing disclosure and discussion, without departing from the spirit or scope of the disclosure or from the scope of the following claims.

I claim:

1. In the process for polymerizing propylene using a coordination catalyst comprising an organoaluminum compound and a titanium trihalide in the presence of a hydrocarbon solvent, the improvement which consists essentially of terminating the polymerization by neutralizing the coordination catalyst with an alkanol solution of an alkali metal alkoxide, wherein the alkanol contains 1 to about 6 carbon atoms and the alkoxide contains 1 to about 6 carbon atoms, and removing the hydrocarbon solvent and alkanol by evaporation to leave polypropylene which is insoluble in boiling heptane and contains the neutralized coordination catalyst.

2. The process of claim 1 wherein the organoaluminum compound is trialkylaluminum and the titanium halide is titanium trichloride.

3. The process of claim 1 wherein the alkanol contains 1 to 3 carbon atoms and the alkoxide contains 1 to 3 carbon atoms.

4. The process of claim 3 wherein the alkoxide is sodium alkoxide or potassium alkoxide.

5. The process of claim 1, wherein the alkanol is methanol and the alkoxide is sodium methoxide or potassium methoxide.

6. The process of claim 1, wherein the concentration of the alkanol solution of alkali metal alkoxide is in the range of about 0.1 to 3 molar.

References Cited

UNITED STATES PATENTS

| | | | |
| --- | --- | --- | --- |
| 2,899,413 | 8/1959 | Hagemeyer et al. | 260—93.7 |
| 2,900,373 | 8/1959 | Martin | 260—94.9 |
| 3,345,304 | 10/1967 | Ross | 260—94.9 |
| 3,335,120 | 8/1967 | Hagemeyer et al. | 260—93.7 |
| 3,012,003 | 12/1961 | Speger | 260—94.9 |

JOSEPH L. SCHOFER, Primary Examiner

E. J. SMITH, Assistant Examiner

U.S. Cl. X.R.

260—45.7